(12) United States Patent (10) Patent No.: US 12,669,393 B2

Otogawa et al. (45) Date of Patent: Jun. 30, 2026

(54) SENSOR DEVICE

(71) Applicant: DENSO CORPORATION, Kariya-city (JP)

(72) Inventors: Yusuke Otogawa, Kariya-city (JP); Masaya Taki, Kariya-city (JP); Hisashi Kameya, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 281 days.

(21) Appl. No.: 18/518,251

(22) Filed: Nov. 22, 2023

(65) Prior Publication Data

US 2024/0094075 A1 Mar. 21, 2024

Related U.S. Application Data

(63) Continuation of application No. PCT/JP2022/020812, filed on May 19, 2022.

(30) Foreign Application Priority Data

May 24, 2021 (JP) ................................. 2021-086888

(51) Int. Cl.
| | |
|---|---|
| *G01L 3/10* | (2006.01) |
| *B62D 5/04* | (2006.01) |

(Continued)

(52) U.S. Cl.
CPC .............. *G01L 3/101* (2013.01); *G01L 5/221* (2013.01)

(58) Field of Classification Search
CPC ....... G01L 3/101; G01L 25/003; G01L 5/221; B62D 5/0421; B62D 5/0484; B62D 5/049; B62D 6/10; B62D 15/025; B62D 6/00; B62D 5/0493; B62D 5/0457; B62D 5/0463; B62D 5/04; B62D 5/046; B62D 15/0235;

(Continued)

(56) References Cited

U.S. PATENT DOCUMENTS

| | | |
|---|---|---|
| 2013/0343472 A1 | 12/2013 | Scherr |
| 2016/0362137 A1 | 12/2016 | Taki et al. |
| 2018/0058962 A1 | 3/2018 | Nakamura et al. |

FOREIGN PATENT DOCUMENTS

| | | | |
|---|---|---|---|
| JP | 2003-296851 A | 10/2003 | |
| JP | 2015-98223 A | 5/2015 | |
| WO | WO-2023013662 A1 * | 2/2023 | ............. G08C 25/00 |

* cited by examiner

*Primary Examiner* — Brandi N Hopkins
(74) *Attorney, Agent, or Firm* — Precision Patents, P.C.

(57) ABSTRACT

A sensor device includes multiple sensors, a controller, and multiple communication paths. Each of the sensors includes a sensor element and a sensor-side communication circuit. The sensor element detects a change in a physical quantity. The sensor-side communication circuit transmits a signal having a response signal according to a detected value of the sensor element, in response to a request signal transmitted by a controller. The controller includes a controller-side communication circuit and an arithmetic processing unit. The controller-side communication circuit transmits the request signal and receives the response signal. The arithmetic processing units calculates detection data according to the response signal. The communication paths respectively connect the sensors to the controller. The arithmetic processing unit calculates detection data by adopting respective response signals in parallel acquired from the sensors.

8 Claims, 16 Drawing Sheets

(51) Int. Cl.
    *G01L 5/22*         (2006.01)
    *G01L 25/00*      (2006.01)
    *G08C 25/00*    (2006.01)

(58) Field of Classification Search
    CPC ..... B62D 5/0481; B62D 15/021; H03M 7/30;
                G08C 15/02; G08C 19/22; H04Q 9/00;
                   H04L 7/0041; G07C 5/085; B60W
              50/0225; B60W 50/0205; B60W 30/045;
                G01B 7/30; Y02T 10/62; G01D 5/145;
             G01D 5/2448; G01D 3/08; G05B 19/0428
    See application file for complete search history.

TIME

ABNORMALITY OCCURRENCE

TIME

ABNORMALITY OCCURRENCE

ARITHMETIC OPERATING CYCLE
OF COMMUNICATION CIRCUIT

RESPONSE
SIGNAL 1

TORQUE DATA
IN SENSOR

REQUEST
SIGNAL 2

RESPONSE
SIGNAL 2

TORQUE DATA
IN SENSOR

TORQUE DATA

TIME

SENSOR DEVICE

CROSS REFERENCE TO RELATED APPLICATIONS

The present application is a continuation application of International Patent Application No. PCT/JP2022/020812 filed on May 19, 2022, which designated the U.S. and claims the benefit of priority from Japanese Patent Application No. 2021-086888 filed on May 24, 2021. The entire disclosures of all of the above applications are incorporated herein by reference.

TECHNICAL FIELD

The present disclosure relates to a sensor device.

BACKGROUND

A sensor device may execute communication between a sensor and a controller. For example, the sensor may transmit a response signal in response to a request signal from a reception circuit.

SUMMARY

The present disclosure describes a sensor device including multiple sensors, a controller, and multiple communication paths.

DETAILED DESCRIPTION

In a system in which there is only a single transmission path and information related to a single sensor element is transmitted for a response signal in response to a single request signal, in a case where multiple pieces of the information of respective multiple sensor elements are transmitted for calculation, the calculation adopting the multiple pieces of information of the respective multiple sensor elements is delayed as compared with a signal reception cycle.

According to an aspect of the present disclosure, a sensor device includes multiple sensors, a controller, and multiple communication paths. Each of the sensors includes a sensor element and a sensor-side communication circuit. The sensor element detects a change in a physical quantity. The sensor-side communication circuit transmits a signal including a response signal according to a detected value of the sensor element, in response to a request signal transmitted by a controller. The response signal is transmitted in response to the request signal on an one-to-one basis.

The controller includes a controller-side communication circuit and an arithmetic processing unit. The controller-side communication circuit transmits the request signal and receives the response signal. The arithmetic processing units calculates detection data according to the response signal. The communication paths respectively connect the sensors to the controller. The arithmetic processing unit calculates detection data by adopting respective response signals in parallel acquired from the sensors. As a result, it is possible to properly calculate the detection data.

Hereinafter, a sensor device according to the present disclosure will be described with reference to the drawings. In the following description of the embodiments, substantially the same parts will be denoted by the same reference numbers, and descriptions thereof will not be repeated.

First Embodiment

Figure 1:
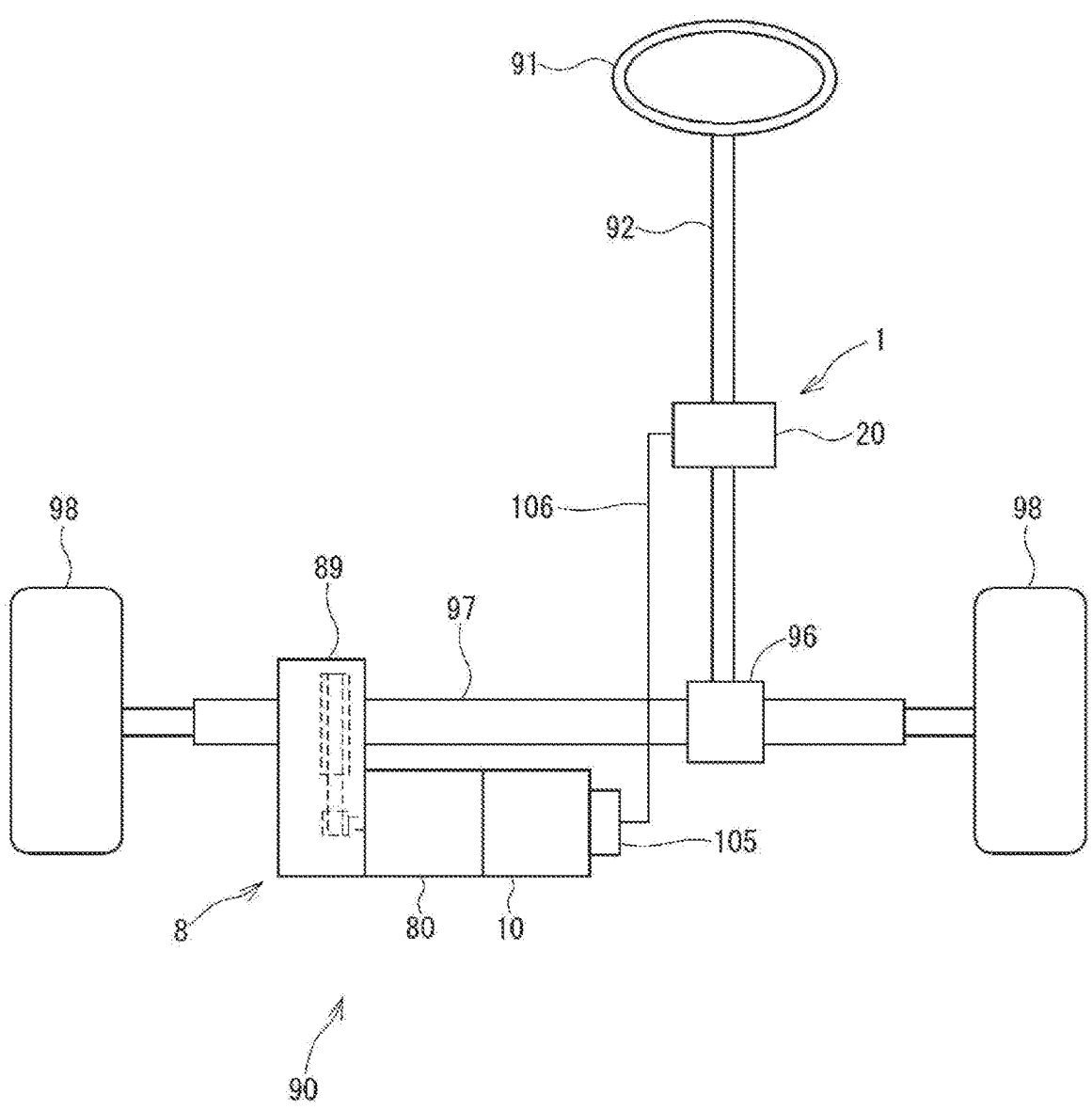
FIG. 1 illustrates a schematic structural view of a steering system according to a first embodiment.

The first embodiment is shown in FIGS. 1 to 11. As shown in FIG. 1, a sensor device 1 includes a torque sensor 20 and an electronic control unit (ECU) 10, and is applied to an electric power steering apparatus 8, which is a steering device for assisting a steering operation of a vehicle.

FIG. 1 shows an overall configuration of a steering system 90 including the electric power steering apparatus 8. The steering system 90 includes a steering wheel 91 which is a steering member, a steering shaft 92, a pinion gear 96, a rack shaft 97, road wheels 98 and the electric power steering apparatus 8.

Figure 2:
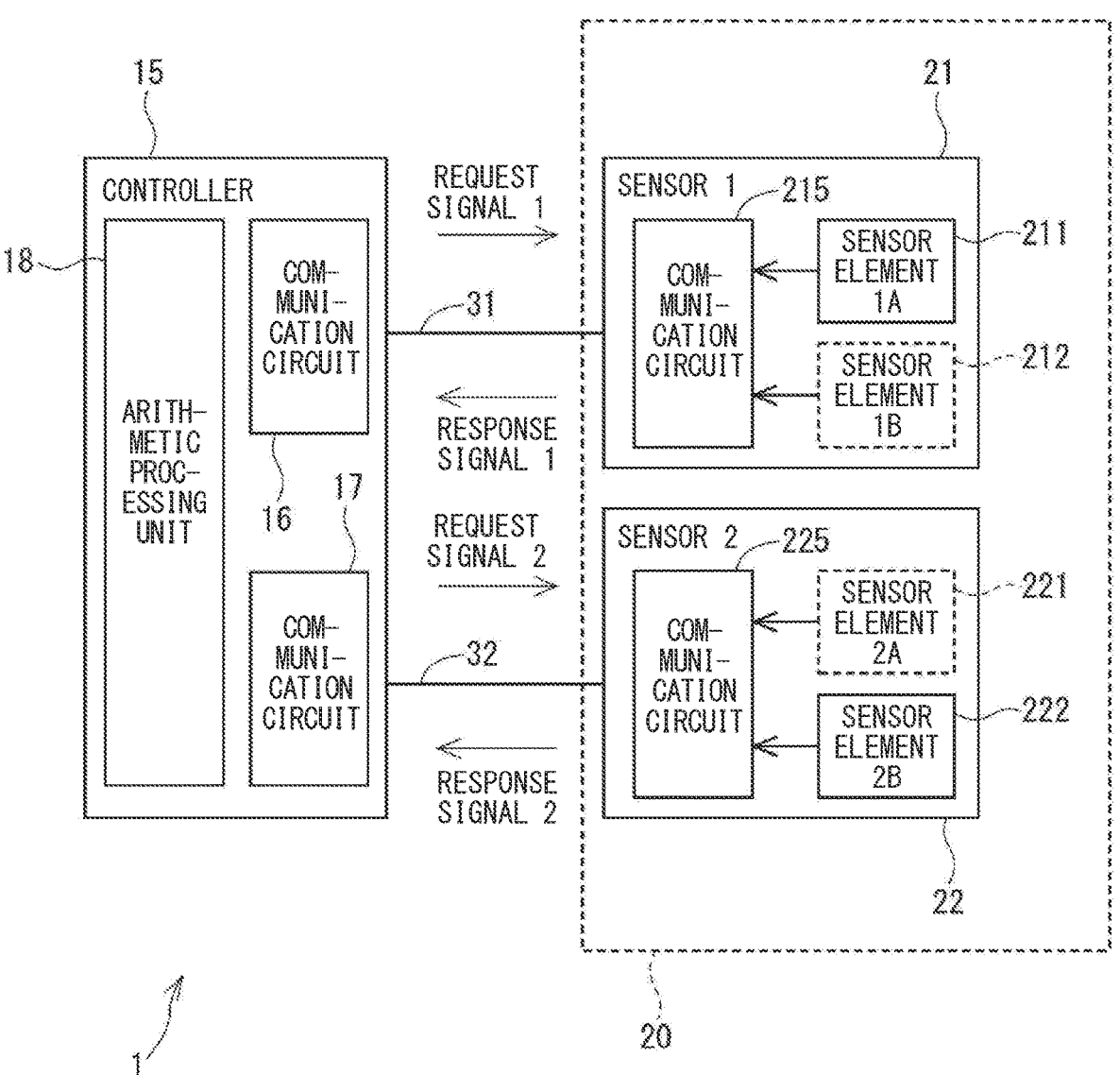
FIG. 2 is a block diagram illustrating a sensor device according to the first embodiment.

The steering wheel 91 is connected to the steering shaft 92. A torque sensor 20 is provided on the steering shaft 92 to detect a steering torque. The torque sensor 20 is connected to the ECU 10 via a harness 106 and a connector 105. As illustrated in FIG. 2, the harness 106 includes communication paths 31, 32. The pinion gear 96 is provided at an axial end of the steering shaft 92. The pinion gear 96 engages with the rack shaft 97. The pair of road wheels 98 is connected to both ends of the rack shaft 97 through tie rods or the like.

When a driver rotates the steering wheel 91, the steering shaft 92 connected to the steering wheel 91 rotates. A rotational motion of the steering shaft 92 is converted into a linear motion of the rack shaft 97 by the pinion gear 96. The pair of road wheels 98 is steered to an angle corresponding to a displacement amount of the rack shaft 97.

The electric power steering apparatus 8 includes, for example, the ECU 10, the torque sensor 20, the motor 80, and a reduction gear 89. The reduction gear 89 is a power transmission mechanism that reduces the rotation of the motor 80 and transmits the reduced rotation to the rack shaft 97. The electric power steering apparatus 8 of the present embodiment is a so-called "rack assist type", but may be a so-called "column assist type" or the like that transmits the rotation of the motor 80 to the steering shaft 92.

The motor 80 is, for example, a three-phase brushless motor, and outputs a part or all of the torque required for steering. The motor 80 is driven by being supplied with electric power from a battery (not shown) to rotate the reduction gear 89 in the forward and reverse directions.

The ECU 10 is integrally provided on one side in an axial direction of the motor 80. That is, the ECU 10 is provided as a mechanically and electrically integrated type. The motor 80 and a controller 15 may alternatively be placed separately. The controller 15 is positioned coaxially with an axis of a motor shaft on the side opposite to the output shaft of the motor 80. By adopting the mechanically and electrically integrated type, it may be possible to efficiently position the controller 15 and the motor 80 in a vehicle having a limited mounting space.

As illustrated in FIG. 2, the ECU 10 includes the controller 15 mainly composed of a microcomputer and the like, and internally includes, although not shown in the figure, a CPU, a ROM, a RAM, an I/O, a bus line for connecting these components, and the like. Each process executed by the controller 15 may be a software process or may be a hardware process. The software process may be implemented by causing the CPU to execute a program. The program may be stored beforehand in a memory device such as a ROM, that is, in a computer-readable, non-transitory, tangible storage medium. The hardware process may be implemented by a special purpose electronic circuit.

As shown in FIG. 2, the controller 15 has, for example, communication circuits 16, 17 and an arithmetic processing unit 18. The arithmetic processing unit 18 may also be referred to as a calculator or a calculation unit. The first communication circuit 16 is connected to a first sensor unit 21 via a first communication path 31. The first communication circuit 16 transmits a request signal to the first sensor unit 21, and receives a response signal in response to the request signal from the first sensor unit 21. The first sensor unit 21 may also be referred to as a first sensor. The sensor unit described in the present disclosure may also be simply referred to as a sensor.

The second communication circuit 17 is connected to a second sensor unit 22 via a second communication path 32. The second sensor unit 22 may also be referred to as a second sensor. The second communication circuit 17 transmits a request signal to the second sensor unit 22 and receives a response signal in response to the request signal from the second sensor unit 22. In the following, the suffix "1" is assigned to a signal transmitted or received between the first communication circuit 16 and the first sensor unit 21; and the suffix "2" is assigned to a signal transmitted or received between the second communication circuit 17 and the second sensor unit 22.

The arithmetic processing unit 18 calculates torque data related to the torque applied to the steering shaft 92 based on the response signals respectively received from the first sensor unit 21 and the second sensor unit 22.

The torque sensor 20 includes the first sensor unit 21 and the second sensor unit 22. In the following, the structure related to the first sensor unit 21 may also be referred to as a first system; and the structure related to the second sensor unit 22 may also be referred to as a second system. The first sensor unit 21 includes sensor elements 211, 212 and a communication circuit 215. The second sensor unit 22 includes sensor elements 221 and 222 and a communication circuit 225. In the following, the sensor element 211 of the first sensor unit 21 may be referred to as a "sensor element 1A"; the sensor element 212 of the first sensor unit 21 may be referred to as a "sensor element 1B; the sensor element 221 of the second sensor unit 22 may be referred to as a "sensor element 2A"; and the sensor element 222 of the second sensor unit 22 may be referred to as a "sensor element 2B".

Each of the sensor elements 211, 212, 221, 222 detects a steering torque applied to the steering shaft 92. For example, each of the sensor elements 211, 212, 221, 222 may be a Hall element that detects a change in the magnetic field of a sensor magnet that is displaced according to the amount of torsion displacement of a torsion bar (not shown) provided on the steering shaft 92.

The sensor device 1 may be adapted to the electric power steering apparatus 8. The electric power steering apparatus 8 is responsible for the "turning" function of a vehicle, and is required to be a highly safe system that realizes non-stop assist. The sensor elements 211, 212, 221, 222 are provided in the torque sensor 20 for redundancy in order to realize a highly safe system.

Figure 18:
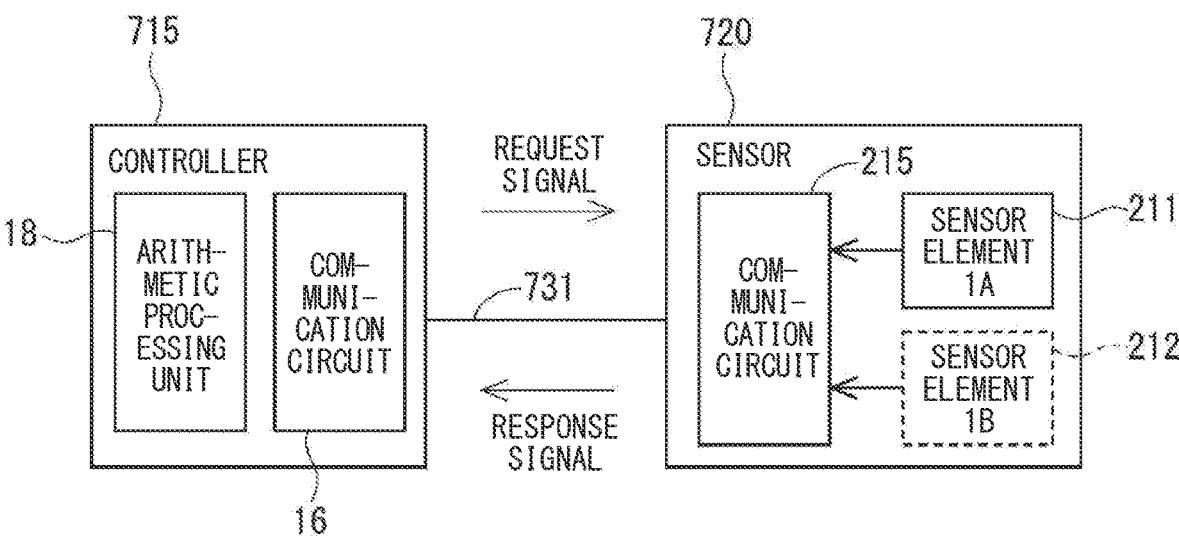
FIG. 18 is a block diagram illustrating a sensor device according to a reference example.
Figure 18:
Figure 19:
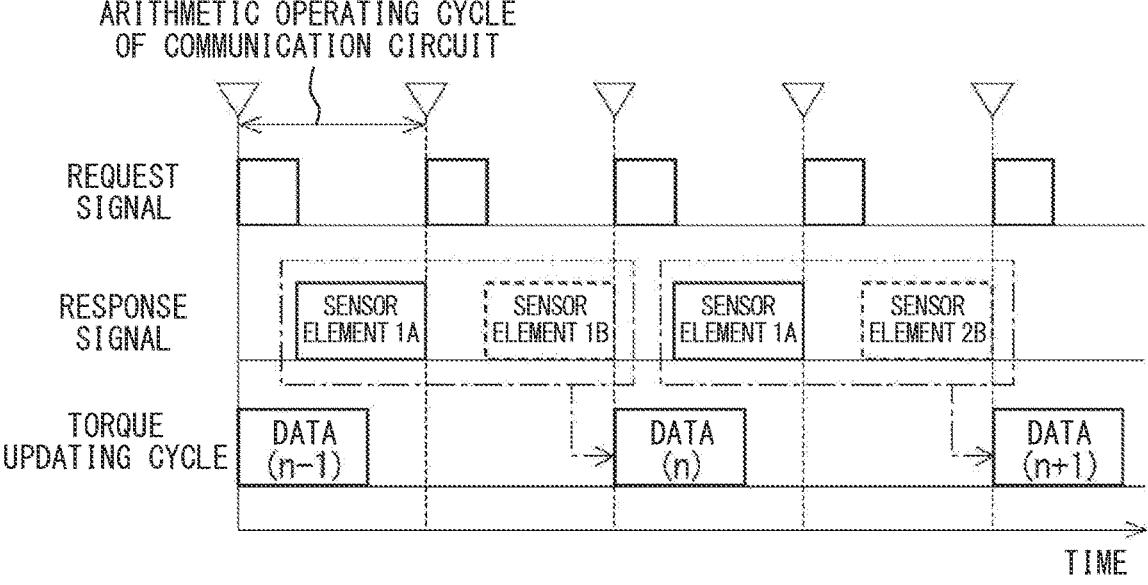
FIG. 19 is a time chart illustrating calculation of torque data according to the reference example.

Here, data communication according to a reference example is shown in each of FIGS. 18 and 19. As shown in FIG. 18, a sensor device 700 shown in the reference example includes a controller 715 and a torque sensor 720. The controller 715 includes a communication circuit 16 and an arithmetic processing unit 18. The torque sensor 720 includes the sensor elements 211, 212 and the communication circuit 215.

The sensor device 700 includes a single communication path 731, and transmits information of a single sensor element in response to a single request signal. As shown in FIG. 19, when the information of the sensor element 211 and the information of the sensor element 212 are alternately transmitted and the torque data is calculated from the information of the two sensor elements 211 and 212, the torque calculation is delayed compared to the arithmetic operating cycle of the communication circuit 16. If the real-time performance is deteriorated due to the delay of the calculation, the sense of steering may be affected.

In the present embodiment, the controller 15 and the torque sensor 20 are connected by the first communication path 31 and the second communication path 32. Therefore, since respective data can be acquired concurrently from the first sensor unit 21 and the second sensor unit 22, torque calculation adopting response signals can be performed while ensuring real-time performance.

Figure 3:
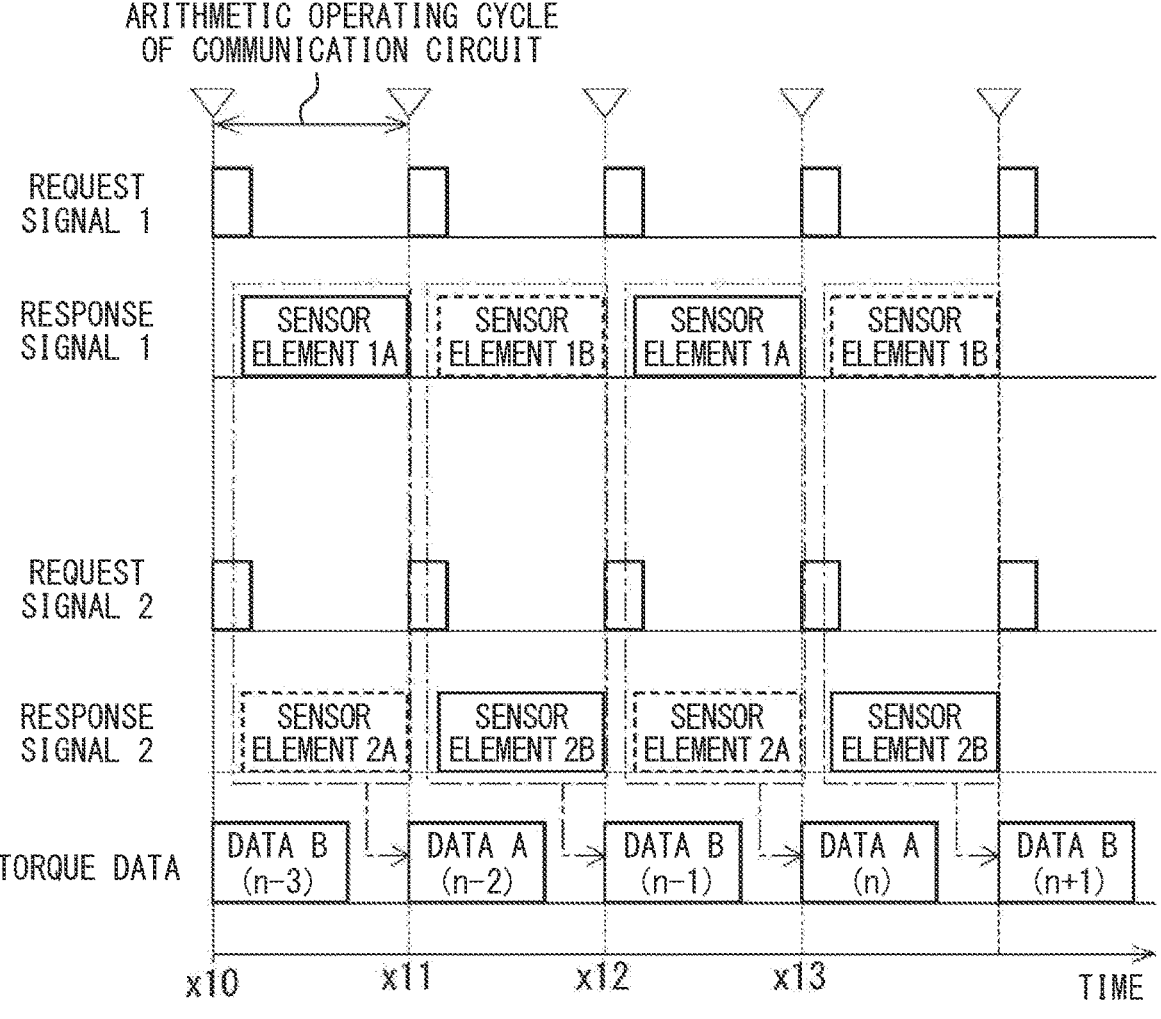
FIG. 3 is a time chart illustrating calculation of torque data according to the first embodiment.

As shown in FIG. 3, the data of the sensor element 1A is transmitted from the first sensor unit 21 to the controller 15 in response to the request signal transmitted from the first communication path 31 at time x10. Further, the data of the sensor element 2A is transmitted from the second sensor unit 22 to the controller 15 in response to the request signal transmitted from the second communication path 32 at the time x10. The arithmetic processing unit 18 performs torque calculation based on the received data of each of the sensor elements 1A and 2A.

Further, the data of the sensor element 1B is transmitted from the first sensor unit 21 to the controller 15 in response to the request signal transmitted from the first communication path 31 at the time x11. Further, the data of the sensor element 2B is transmitted from the second sensor unit 22 to the controller 15 in response to the request signal transmitted from the second communication path 32 at the time x11. The arithmetic processing unit 18 performs torque calculation based on the received data of each of the sensor elements 1B and 2B. In the following, torque data A is the torque calculation result based on the sensor elements 1A and 2A; and torque data B is the torque calculation result based on the sensor elements 1B and 2B.

In a situation where the processing at time x12 is identical to the processing at time x10; and the processing at time x13 is identical to the processing at time x13, the data reception from the sensor elements 1A, 2A and the data reception from the sensor elements 1B, 2B are alternately repeated, and the calculation of the torque data A and the calculation of the torque data B are alternately repeated. The calculation of the torque data A adopts the data received from the sensor elements 1A, 2A, and the calculation of the torque data B adopts the data received from the sensor elements 1B, 2B.

As a result, the arithmetic operating cycle of the communication circuit and the arithmetic operating cycle of the torque data are identical. Therefore, it is possible to perform calculation of the torque using data of multiple sensor elements. Additionally, through the comparison with multiple pieces of data, it is possible to detect an abnormality such as voltage fixation. The fault may also be referred to as an error. The fault of the sensor units 21, 22 is a state in which the controller 15 cannot acquire a normal detected value. The fault does not only include the abnormality of the sensor units 21, 22, but may also include the abnormality of the communication paths 31, 32. The term "arithmetic operating cycle" may also be referred to as a "calculating cycle".

Figure 4:
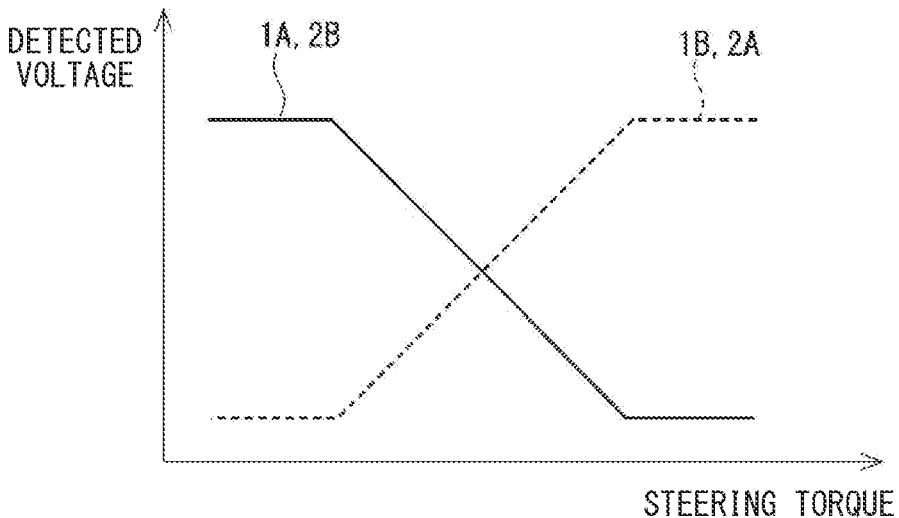
FIG. 4 is an explanatory diagram illustrating an output signal of the sensor device according to the first embodiment.

The following describes the output signal of each of the sensor elements 1A, 1B, 2A, 2B based on FIG. 4. In FIG. 4, the horizontal axis represents the steering torque; and the vertical axis represents the detected voltage of each of the sensor elements 211, 212, 221, and 222. In a detectable range, as indicated by a solid line, the detected voltage of each of the sensor elements 1A and 2B decreases as the torque increases. In the detectable range, as indicated by a dashed line, the detected voltage of each of the sensor elements 1B and 2A increases as the torque increases. The same line style also applies to the block indicative of the response signal in, for example, FIG. 3.

In the present embodiment, the respective signals of the sensor elements 1A and 2A having the same characteristics but reversed outputs are obtained at the identical timing, and the respective signals of the sensor elements 1B and 2B are obtained at the identical timing. It is possible to easily detect an abnormality such as a fixation fault as compared to the case where the signals respectively having the same increase/decrease characteristics are acquired at the identical timing.

Figure 5:
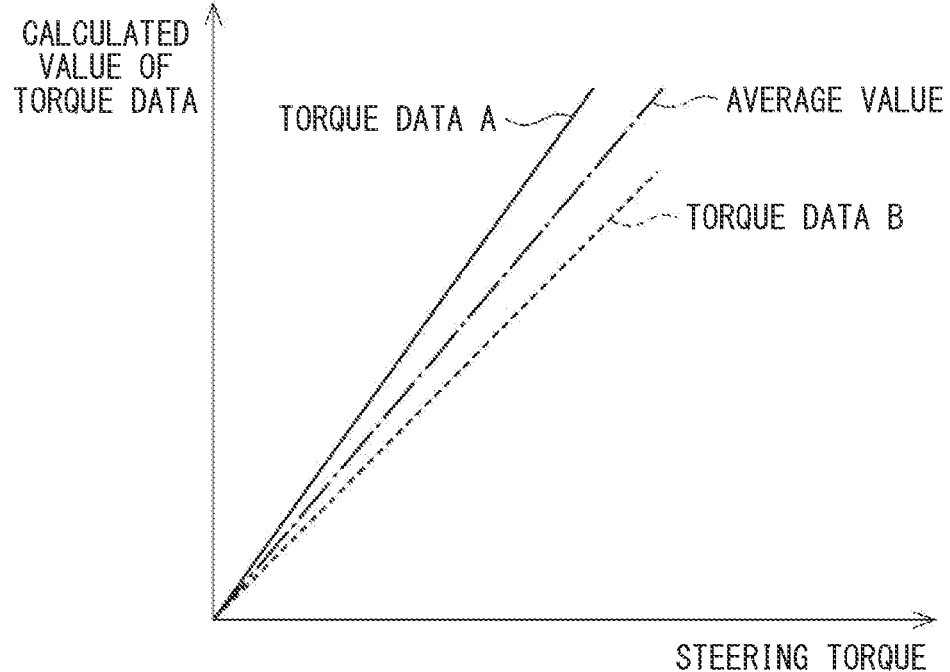
FIG. 5 is an explanatory diagram illustrating the torque data according to the first embodiment.
Figure 6:
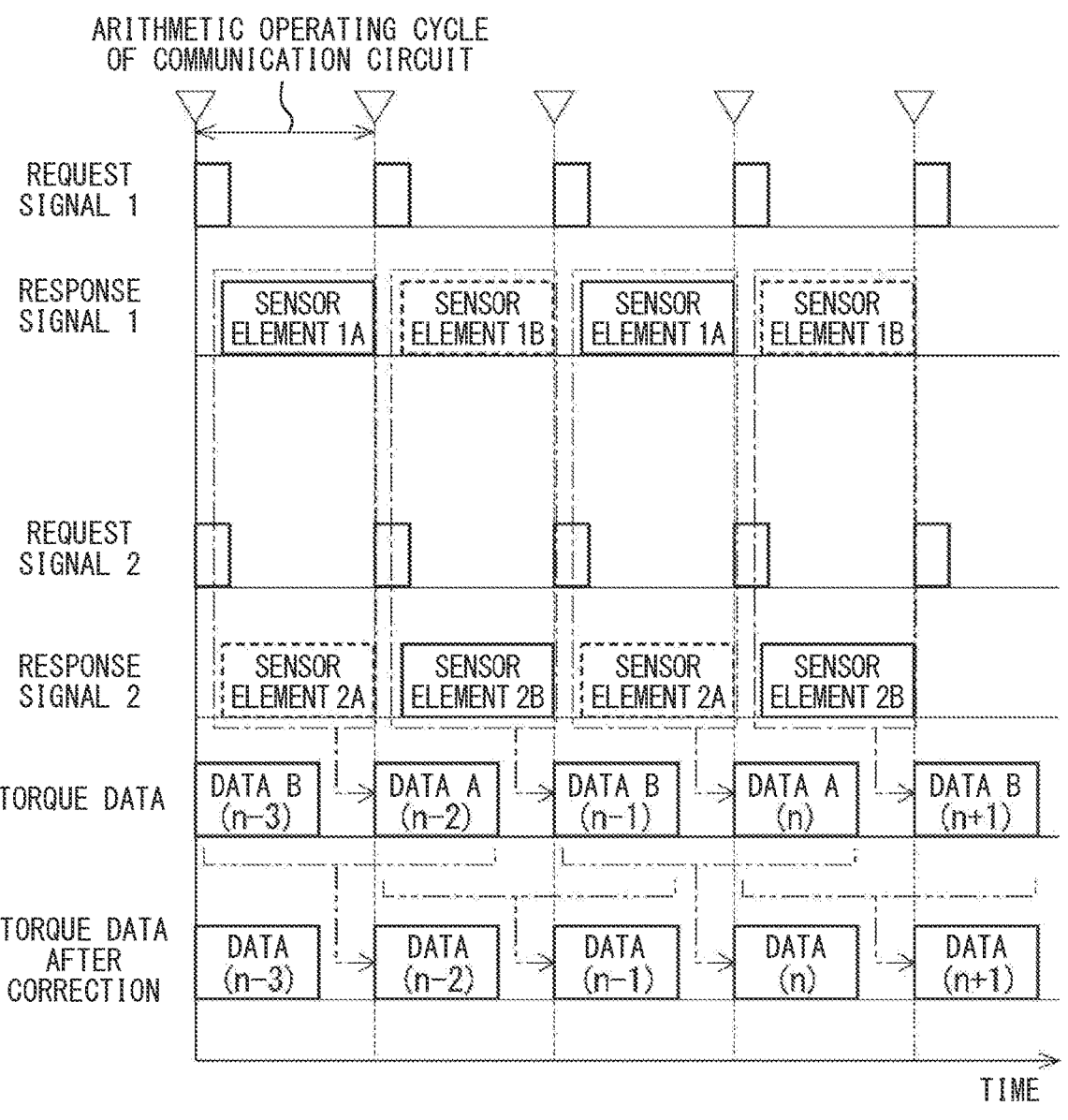
FIG. 6 is a time chart illustrating calculation of torque data after being corrected according to the first embodiment.

In FIG. 5, the horizontal axis represents the steering torque, and the vertical axis represents the calculated value of the torque data. As shown in FIG. 5, when the torque data A and B are alternately used, an output fault may occur due to variations in output characteristics or the like. In the present embodiment, as shown in FIG. 6, the output fault is corrected by averaging the present value and the previous value of the torque data. In the following, the torque data obtained by averaging the present value and the previous value is appropriately used as corrected torque data. The corrected torque data may also be referred to as the torque data after correction or the torque data after being corrected. Various calculations may be performed using the torque data shown in FIG. 3 without performing the correction shown in FIG. 6. In FIG. 6, the horizontal axis represents a common time axis, and the vertical axis indicates, from the top, the request signal of the first system, the request signal of the second system, the response signal of the second system, the torque data, and the corrected torque data. The same applies to the time chart according to other embodiment described hereinafter. FIG. 3 is also identical except the matter in which the corrected torque data is omitted.

Figure 7:
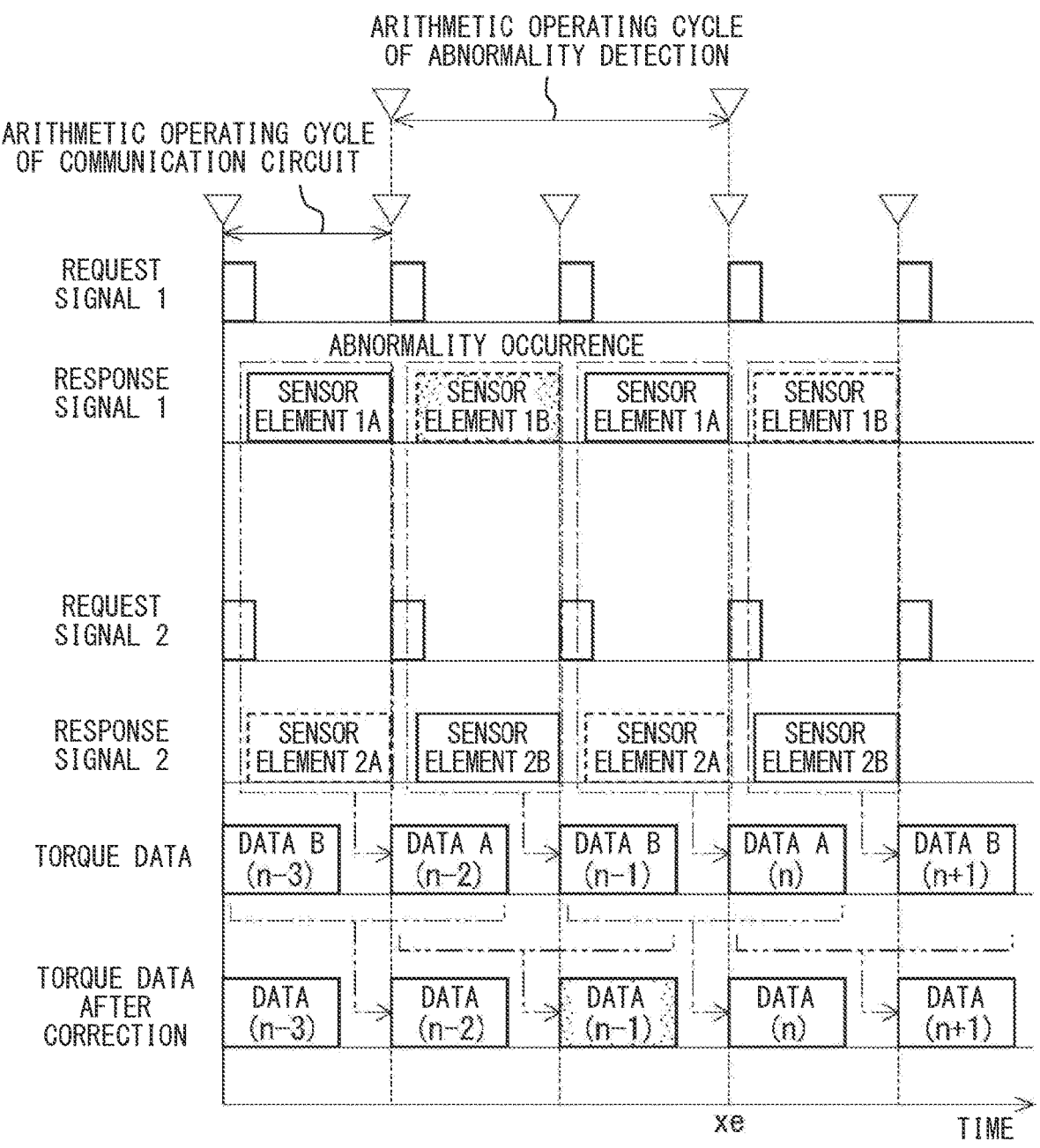
FIG. 7 is a time chart illustrating a situation where an abnormality occurs in a single sensor according to the first embodiment.

FIG. 7 illustrates a situation where a single sensor element has an abnormality. FIG. 7 illustrates an example in which an abnormality occurs in the response signal of the sensor element 1B indicated by a satin finished pattern (a dotted pattern). The corrected torque data calculated in a period from the abnormality occurrence to the time xe at which the abnormality is detected is averaged with the normal torque data A, the effect of the abnormality is reduced as compared with a situation where the torque correction is not performed.

Figure 8:
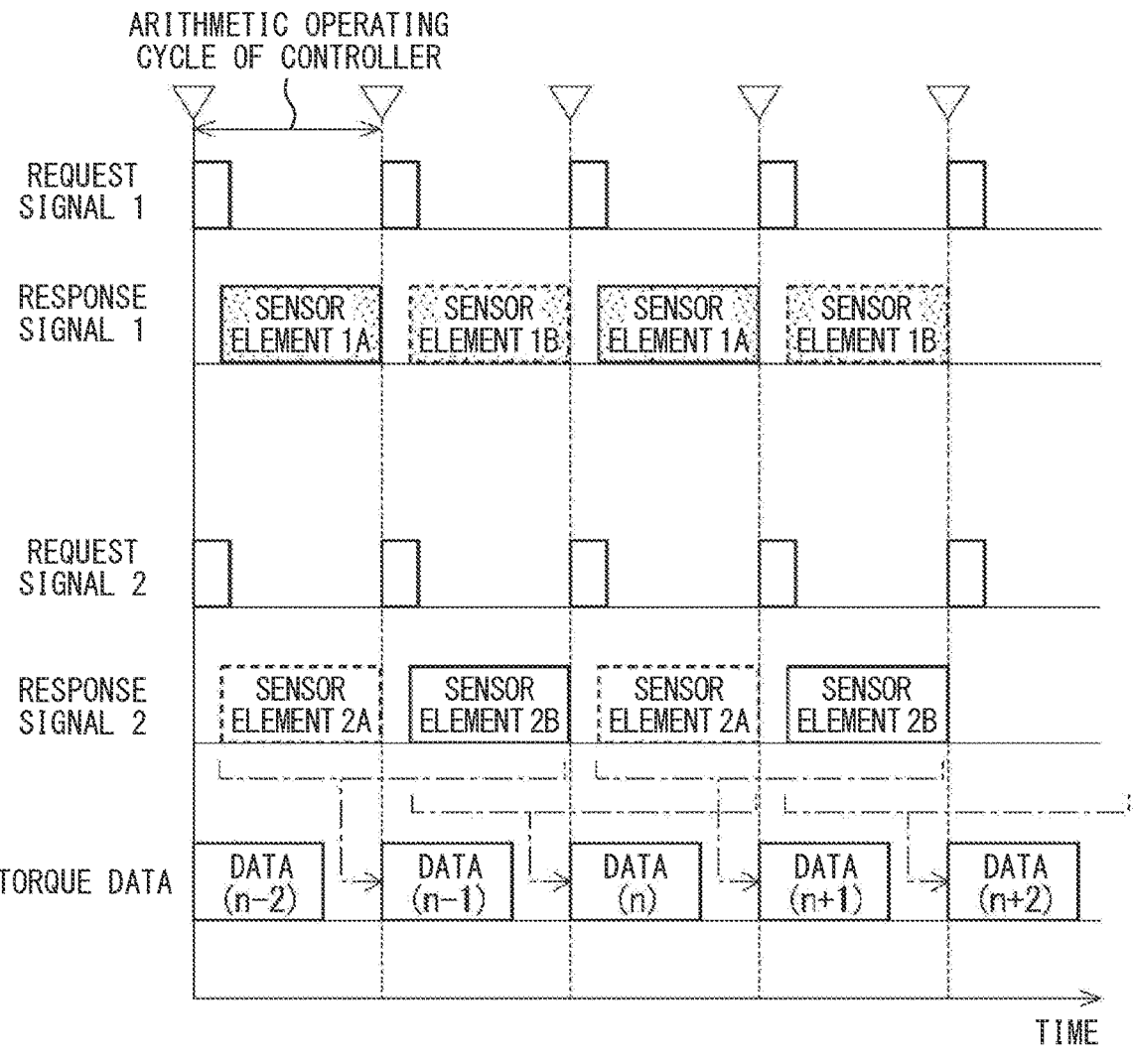
FIG. 8 is a time chart illustrating torque data in a situation where an abnormality occurs in a single sensor according to the first embodiment.

As shown in FIG. 8, when an abnormality occurs in the first sensor unit 21, the data of the sensor elements 2A and 2B alternately transmitted from the second sensor unit 22 are used to calculate the average value of the present value and the previous value for the calculation of the torque data. As a result, even if an abnormality occurs in one of the sensor units, the arithmetic operating cycle of the torque calculation is maintained, so the torque calculation using the detected values of multiple sensor elements can be continued without reducing real-time performance. In FIG. 8 or the like, the response signal related to the first sensor unit 21 in which an abnormality has occurred is indicated by a satin finished pattern (a dotted pattern).

Figure 9:
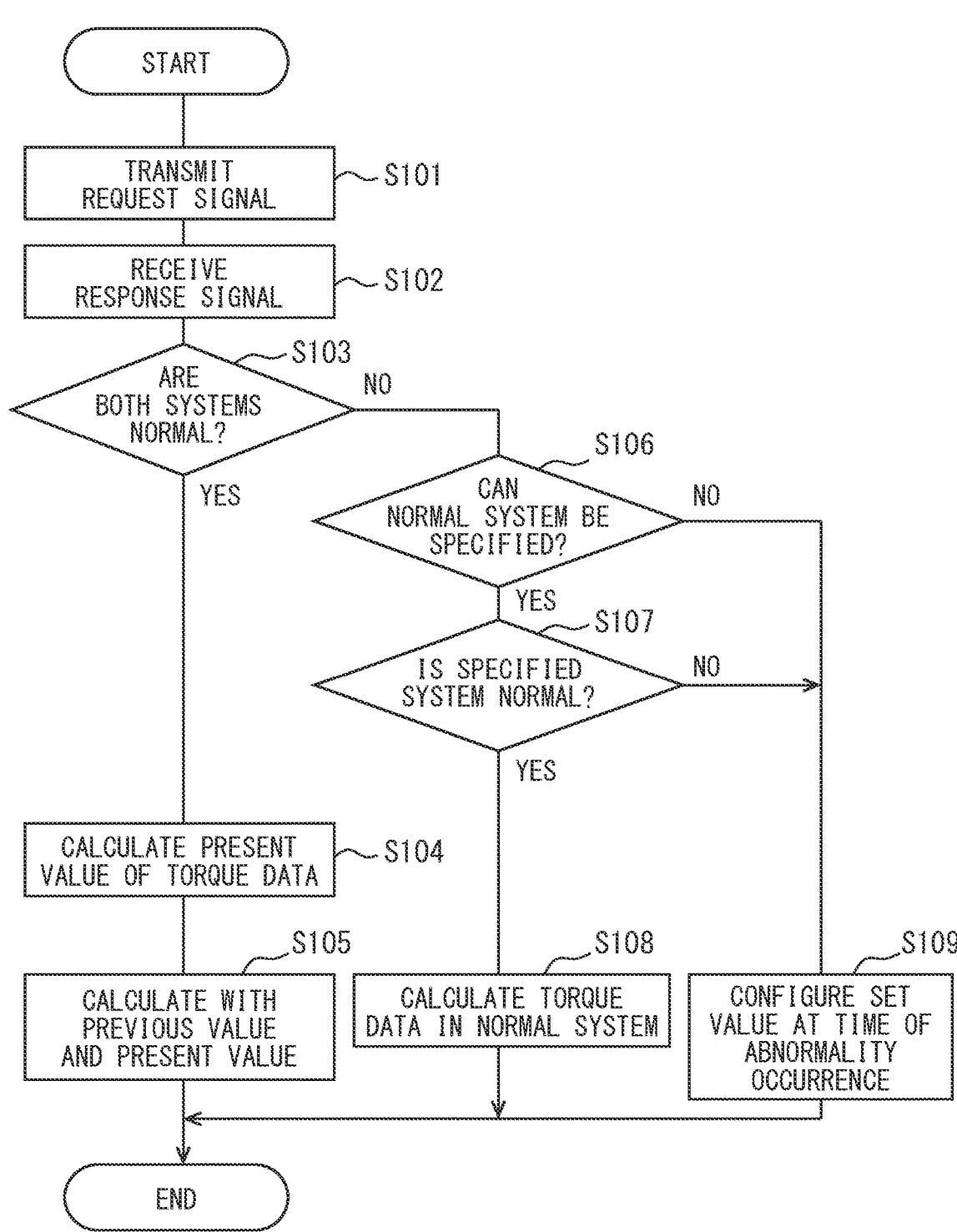
FIG. 9 is a flowchart illustrating torque calculation processing according to the first embodiment.

The torque calculation process according to the present embodiment will be described with reference to a flowchart of FIG. 9. This process is performed by the controller 15 in a predetermined cycle. Also, a subscript "n" is appended to the present value; a subscript "n−1" is appended to the first nearest preceding value; and a subscript "n−2" is appended to the second nearest preceding value. In the explanation of the flowchart, as an example, the data of each of the sensor elements 1A, 2A is acquired at the present time; and the data of each of the sensor elements 1B, 2B is acquired at the previous time as a first nearest preceding time. In a case where the data of the sensor element 1B, 2B is acquired at the present time, 1A, 1B and 2A, 2B may appropriately be replaced. The first nearest preceding time corresponds to a first nearest preceding occurrence.

In S101, the controller 15 transmits request signals to the sensor units 21 and 22. In S102, the controller 15 receives from the sensor units 21 and 22 the response signals transmitted in response to the request signal.

In S103, the arithmetic processing unit 18 determines whether the acquired response signals of both systems are normal. In the present embodiment, the detected voltages of the sensor elements 1A and 2A acquired at the identical timing have the same characteristics but opposite outputs, and a value acquired by adding the detected voltages of the sensor elements 1A, 2B is regarded as an abnormality determined value X as described in the following equation (1). In the equation, V1 denotes the detected voltage detected by the first sensor unit 21; and V2 denotes the detected voltage detected by the second sensor unit 22.

$$X=V1(n)+V2(n) \qquad \text{(equation 1)}$$

Based on the abnormality determined value X, the arithmetic processing unit 18 determines whether both systems are normal. If the abnormality determined value X is within a predetermined range including the normal value Xt, the abnormality determined value X and the normal value Xt are considered to be consistent with each other, and it is determined that both systems are normal. If both systems are determined to be normal (S103: YES), that is, if the abnormality determined value X and the normal value Xt are consistent with each other, the process proceeds to S104. If it is determined that at least one system has an abnormality (S103: NO), that is, if the abnormality determined value X and the normal value Xt are not consistent with each other, the process proceeds to S106.

Figure 10:
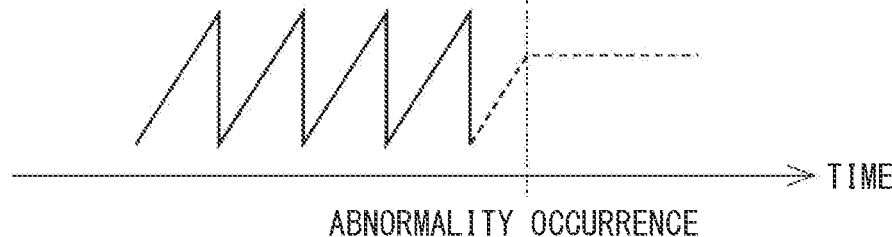
FIG. 10 is an explanatory diagram illustrating frame data of the response signal according to the first embodiment.
Figure 11:
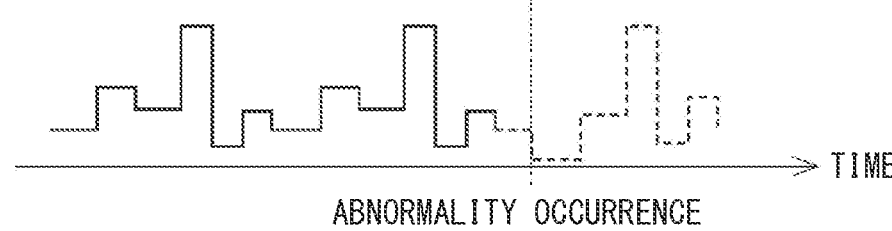
FIG. 11 is an explanatory diagram illustrating check data for checking the response signal according to the first embodiment.

In S103, as shown in FIG. 10, a data discontinuity may be detected by including frame data in the response signal. As illustrated in FIG. 11, at least one of the request signal and the response signal may have check data such as Cyclic Redundancy Check (CRC) or parity check to detect data abnormality. If it is determined that at least one of the systems has an abnormality based on the frame data and the check data, a negative determination is made.

In S104, the arithmetic processing unit 18 calculates the present value T(n) of the torque data based on the detected values of the sensor elements 1A and 2A as expressed in the following equation (2). In S105, the arithmetic processing unit 18 uses the present value T(n) of the torque data and the previous value T(n−1) of the torque data to calculate the corrected torque data Tc(n). In the equation, T1 denotes the torque converted value of the detected voltage V1, and T2 denotes the torque converted value of the detected voltage V2. In the torque conversion, a coefficient is multiplied according to the specified outputs of the sensor elements 1A, 1B, 2A, and 2B.

$$T(n)=(T1(n)+T2(n))/2 \qquad \text{(equation 2)}$$

$$T(n-1)=(T1(n-1)+T2(n-1))/2 \qquad \text{(equation 3)}$$

$$Tc(n)=(T(n)+T(n-1))/2 \qquad \text{(equation 4)}$$

In a case where it is determined that at least one system has an abnormality (S103: NO), the process proceeds to S106. S106 calculates the abnormality determined value Y1 according to the first system and the abnormality determined value Y2 according to the second system, and determines whether or not the normal system can be specified based on the abnormality determined values Y1, Y2.

$$Y1=\{(T1(n)+T1(n-2))/2\}-T1(n-1) \qquad \text{(equation 5)}$$

$$Y2=\{(T2(n)+T2(n-2))/2\}-T2(n-1) \qquad \text{(equation 6)}$$

When the rate of change in the torque is considered to be constant, if normal, the average value of the torque converted values based on the detected values of the sensor element 1A corresponding to the request signal acquired at the present time and the request signal acquired two times before the present time and the torque converted value based on the detected value of the sensor element 1B corresponding to the request signal acquired at the previous time are theoretically consistent with each other. Therefore, the abnormality determined values Y1, Y2 are compared with a determination threshold value TH1, and a system in which the abnormality determined values Y1 and Y2 are smaller than the threshold value TH1 is specified as the normal system. If it is determined that the normal system can be specified (S106: YES), the process proceeds to S107. The system specified as normal is considered as a specified system. In a case where it is determined that the normal system cannot be specified (S106: NO), the process proceeds to S109.

In S107, the arithmetic processing unit 18 calculates fault determined values Yp and Yq for the system identified as normal in S107 as expressed in the equations (7) and the equation (8), and monitors an abnormality in a single system based on the abnormality determined values Yp, Yq. The fault determined value Yp is the difference between the previous value and the average value of the present value acquired at the present time and the value acquired at two times before the present time (in other words, the value acquired at the second nearest preceding time with respect to the present time). The fault determined value Yq is the difference between the value acquired at two times before the present time (in other words, the second nearest preceding time with respect to the present time) and the average value of the previous value acquired at the previous time (in other words, the value acquired at the first nearest preceding time with respect to the present time) and the value acquired three times before the present time (in other words, the value acquired at the third nearest preceding time with respect to the present time). In the equation (7) and the equation (8), T#denotes the torque converted value of the normal system. If the first system is normal, #is 1 (#=1). If the second system is normal, #is 2 (#=2).

$$Yp=\{(T\#(n)+T\#(n-2))/2\}-T\#(n-1) \qquad \text{(equation 7)}$$

$$Yq=\{(T\#(n-1)+T\#(n-3))/2\}-T\#(n-2) \qquad \text{(equation 8)}$$

For example, if an abnormality occurs in the first system and the second system is identified as the normal system, one of the abnormality determined values Yp and Yq is the average value of the two values of the sensor element 2A and the value of the sensor element 2B, and the other one of the abnormality determined values Yp and Yq is calculated based on the average value of the two values of the sensor element 2B and the sensor element 2A. In the present embodiment, when both of the abnormality determined values Yp and Yq are smaller than the determination threshold value TH2, it is determined that the specified system is normal. The determination threshold value TH2 may be equal to the determination threshold value TH1, or may be different from the determination threshold value TH2. Alternatively, the calculation of the abnormality determined value Yq may be omitted and the determination may be made by adopting only the abnormality determined value Yp.

If it is determined that the specified system is normal (S107: YES), in other words, if the abnormality determined values Yp, Yq are smaller than the determination threshold value TH2, the process proceeds to S108. If it is determined that the specified system is not normal (S107: NO), that is, if at least one of the abnormality determined values Yp and Yq is equal to or greater than the determination threshold TH2, the process proceeds to S109.

In S108, the arithmetic processing unit 18 calculates the torque data Te(n) based on the detected value of the normal system as expressed in the following equation (9). In S109, the arithmetic processing unit 18 sets the present value T(n) of the torque data as the set value at the time of fault occurrence.

$$Te(n)=(T\#(n)+T\#(n-1))/2 \qquad \text{(equation 9)}$$

As described above, the sensor device 11 according to the present embodiment includes the multiple sensor units 21, 22, the controller 15, and the multiple communication paths 31, 32. The sensor units 21, 22 include the sensor elements 211, 212, 221, 222 and the communication circuits 215, 225. Each of the sensor elements 211, 212, 221, 222 detects a change in a physical quantity. Each of the communication circuits 215, 225 transmits a single response signal corresponding to each corresponding one of the detected values of the sensor elements 211, 212, 221, 222 in response to a single request signal.

The controller 15 includes the communication circuits 16, 17 and the arithmetic processing unit 18. Each of the communication circuits 16, 17 transmits the request signal for requesting the transmission of the response signal and receives the response signal. The arithmetic processing unit 18 calculates the torque data according to the response signal. The multiple communication paths 31, 32 individually connect the sensor units 21, 22 to the controller 15.

The arithmetic processing unit 18 adopts the response signals acquired concurrently in parallel from the multiple sensor units 21, 22 to calculate the torque data. The phrase "the response signals acquired concurrently" means that the response signals are transmitted in response to the transmitted response signals at a substantially identical timing. A slight deviation due to, for example, an individual variation is within an acceptable range. As a result, it is possible to properly calculate the torque data based on the response signals respectively acquired from the multiple sensor units 21, 22 concurrently.

Each of the sensor units 21 and 22 has k sensor elements, where k is an integer larger than or equal to 2. The sensor units 21 and 22 transmit, as response signals, signals corresponding to the detected values of the first to $k_{th}$ sensor elements in a predetermined order. In the present embodiment, since k is equal to 2, the response signals corresponding to the respective detected values of the two sensor elements are alternately transmitted. In other words, the detected values of all the sensor elements are transmitted once for k request signals.

The arithmetic processing unit 18 calculates the torque data based on the response signals presently acquired from the multiple sensor units 21, 22, and adopts the detection data calculated at each of the $(k-1)_{th}$ nearest preceding time to the present time to calculate the corrected detection data. $(k-1)_{th}$ nearest preceding time corresponds to $(k-1)_{th}$ nearest preceding occurrence.

As a result, it is possible to detect an abnormality such as voltage fixation in the sensor element by adopting the detected values of the multiple sensor elements 211, 212, 221, 222 to calculate the torque data. In a structure where a single response signal is transmitted in response to a single request signal, the communication paths 31, 32 are respectively provided for the sensor units 21, 22, and the torque data can be calculated through the combination of the respective response signals of the multiple sensor units 21, 22. Therefore, it is possible to shorten the updating cycle and enhance the real-time performance.

It is possible to reduce an error due to characteristic variation by adopting the response signals respectively transmitted from the multiple sensor units 21, 22 to calculate the torque data. In a case where an abnormality occurs in one or more sensor elements, the effect of the abnormality occurrence can be reduced in the torque data until the detection of the abnormality.

In a case where an abnormality occurs in one or more sensor units 21, the arithmetic processing unit 18 calculates the torque data by adopting the response signals transmitted from the sensor unit 22 in a normal state at the $(k-1)_{th}$ nearest preceding time to the present time. As a result, even though an abnormality occurs in one or more sensor units 21, it is possible to calculate the torque data based on the detected values of the multiple sensor elements 221, 222 of the sensor unit 22 at the normal state. Since the arithmetic operating cycle can be maintained at the same level as in the normal operation, the real-time performance can be ensured.

In a case where k is equal to 2 and one or more sensor units 21 has an abnormality, the response signals corresponding to the sensor elements 221, 222 are alternately transmitted from a single sensor unit 22 in a normal state. The arithmetic processing unit 18 adopts the latest four response signals transmitted from the single sensor unit 22 in the normal state to monitor the abnormality in the sensor unit 22. As a result, even though an abnormality occurs in one or more sensor units 21, it is possible to monitor the abnormality in the sensor unit 22 in the normal state.

Second Embodiment

Figure 12:
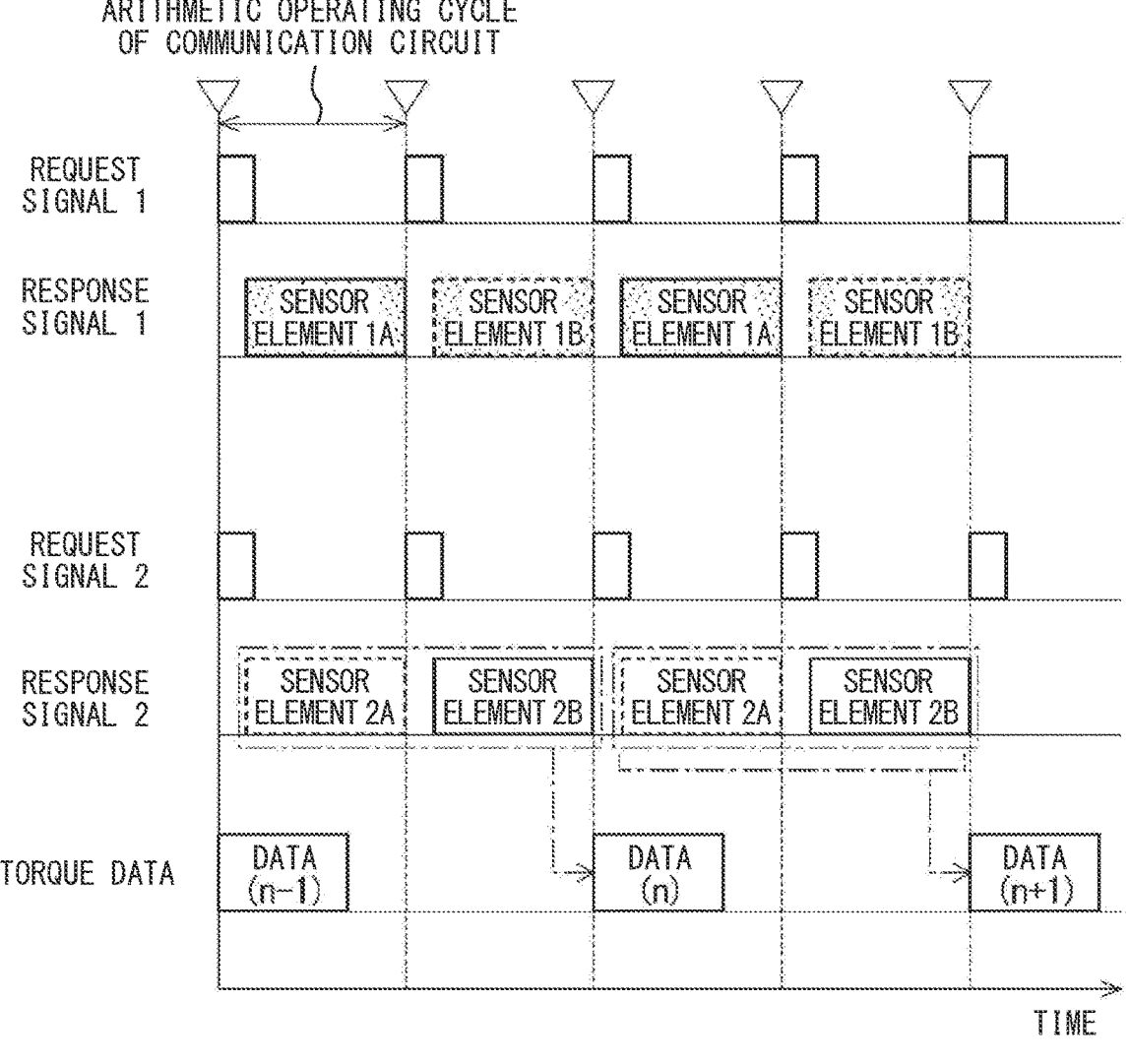
FIG. 12 is a time chart illustrating calculation of torque data at a time in which one of two systems has an abnormality according to a second embodiment.
Figure 13A:
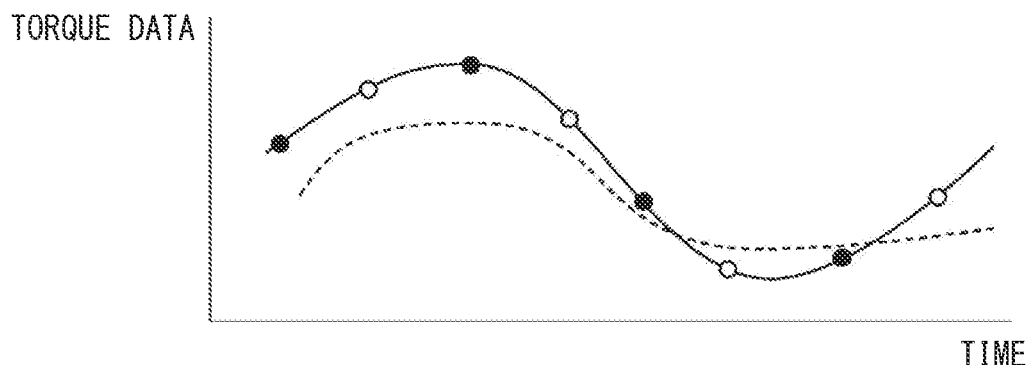
FIG. 13A illustrates torque data before being corrected according to the second embodiment.
Figure 13B:
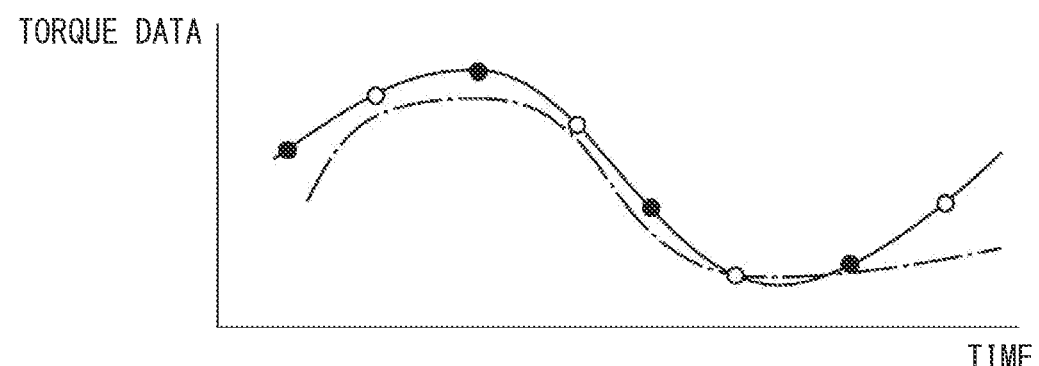
FIG. 13B illustrates the torque data after being corrected according to the second embodiment.

The second embodiment is illustrated in FIGS. 12, 13A, and 13B. In the second embodiment and a third embodiment, and a fourth embodiment, the process in a situation where an abnormality occurs in a portion of the torque sensor 20 is different from that of the above embodiment; therefore, this point will be mainly described. In the second to fourth embodiments, a situation in which the first system has an abnormality and the second system is in the normal state is taken as an example. Although the torque calculation in the normal state may be similar to the first embodiment, the torque calculation described in a fifth embodiment described hereinafter may also be applied.

In the present embodiment, an erroneous location in the first system as an abnormal system cannot be specified. As shown in FIG. 12, in a case where the torque data is calculated at a timing where the response signal according to the sensor element 2B is acquired based on the detected values of the sensor elements 2A, 2B of the second sensor unit 22 in the normal state, the updating cycle of the torque data becomes longer as compared with a case in which the torque data is updated at a cycle identical to the arithmetic operating cycle of the communication circuits 16, 17 as in the first embodiment.

In FIGS. 13A and 13B, the horizontal axis represents time, and the vertical axis represents the torque data. In FIGS. 13A and 13B, each of black circles indicates the torque update timing during normal operation and the control of a single system; and each of white circles indicates that the torque data is updated only during the normal operation and is not updated during the control of the single system.

As shown in FIG. 13A, the input signal during single-system control indicated by the dashed line may be delayed with respect to the input signal during normal operation indicated by the solid line. In the present embodiment, phase lead compensation is added during single-system control, as indicated by the dashed line in FIG. 13B. Thereby, the effect of the delay of calculation can be reduced.

In the present embodiment, in a case where an abnormality occurs in one or more sensor units 21, the arithmetic processing unit 18 calculates the torque data by adopting the response signals corresponding to the multiple sensor elements 221, 222 acquired from the sensor unit 22 in the normal state. If the arithmetic operating cycle of the torque data at the time of the abnormality occurrence is longer than the arithmetic operating cycle at the normal state, the arithmetic processing unit 18 performs phase advance compensation as correction processing for correcting the calculation delay. The correction processing for correcting the calculation delay may be calculation processing other than the phase advance compensation. As a result, it is possible to reduce the effect of calculation delay when an abnormality occurs in one or more the sensor units 21. Further, the similar effects to those of the embodiment described above can also be achieved.

Third Embodiment

Figure 14:
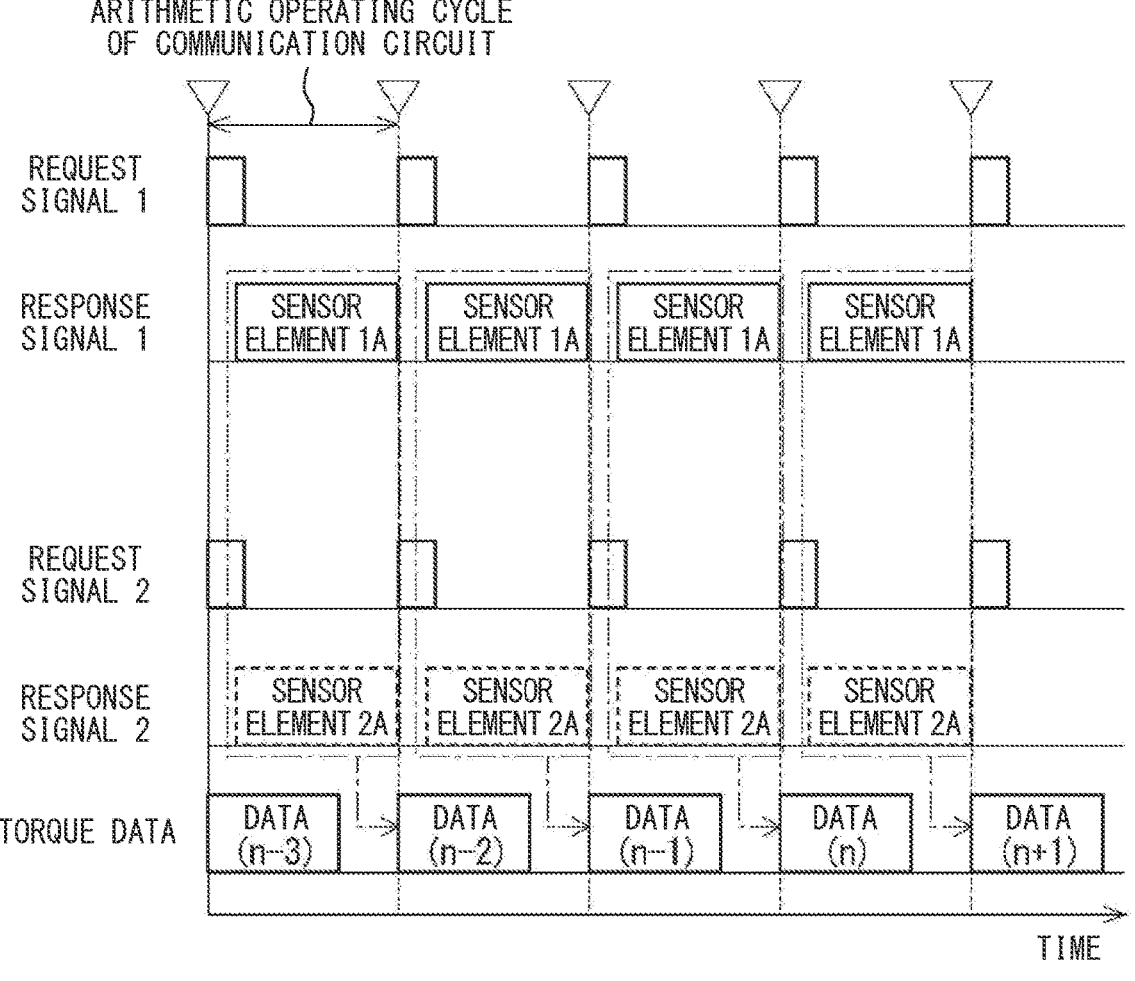
FIG. 14 is a time chart illustrating calculation of torque data at a time where one of two systems has an abnormality according to a third embodiment.

A third embodiment is illustrated in FIG. 14. In the third embodiment and the fourth embodiment, an example in which an abnormality occurs in the first system and the location of the abnormality can be specified will be described. In the following, the sensor element 1B is specified as an erroneous element and the sensor element 1A is specified as a normal element.

As shown in FIG. 14, the first sensor unit 21 transmits a response signal according to the detected value of the sensor element 1A as the normal element. The second sensor unit 22 transmits a response signal according to the detected value of the sensor element 2A, which is transmitted concurrently with the sensor element 1A during the normal operation. In the second sensor unit 22, even if the sensor element 2B is normal, a signal transmission pattern is changed to transmit a signal according to the sensor element 2A instead of alternately transmitting signals according to the sensor elements 2A and 2B. The arithmetic processing unit 18 continues torque calculation using the sensor elements 1A and 2A.

Even though an abnormality occurs in one or more sensor elements 1B, it is possible to detect the abnormality by continuing the arithmetic operation by adopting the values of the different sensor units 21, 22 even in a case where the abnormality such as voltage fixation occurs in one of the sensor units. Also, the torque updating cycle can be made equal to that in the normal operation. By performing torque calculation using the same sensor elements 1A and 2A, a variation in the torque data due to a characteristic variation in the sensor element can be prevented.

In the present embodiment, in a case where an abnormality occurs in a portion of the sensor unit 21; and a normal element in the abnormal system as a sensor element, for example, the sensor element 1A in the present embodiment capable of transmitting a normal detected value can be specified, the arithmetic processing unit 18 calculates the torque data by adopting the response signal according to the detected value of the normal element in the abnormal system and the response signal from the sensor unit 22 as a normal system. As a result, even though the abnormality occurs at a portion of the sensor unit 21, it is possible to continue the torque calculation while continuing the abnormality monitoring. Since the arithmetic operating cycle can be maintained at the same level as in the normal operation, the real-time performance can be ensured.

The sensor unit 22 in the normal state changes the signal transmission pattern before the abnormality occurrence, such that the transmission of the response signal according to the detected value of the sensor element 2A is concurrently with the transmission of the response signal generated in the normal element in the abnormal system. As a result, a variation in the torque data caused by a variation in each of the sensor elements 2A, 2B can be prevented. Further, the similar effects to those of the embodiment described above can also be achieved.

Fourth Embodiment

Figure 15:
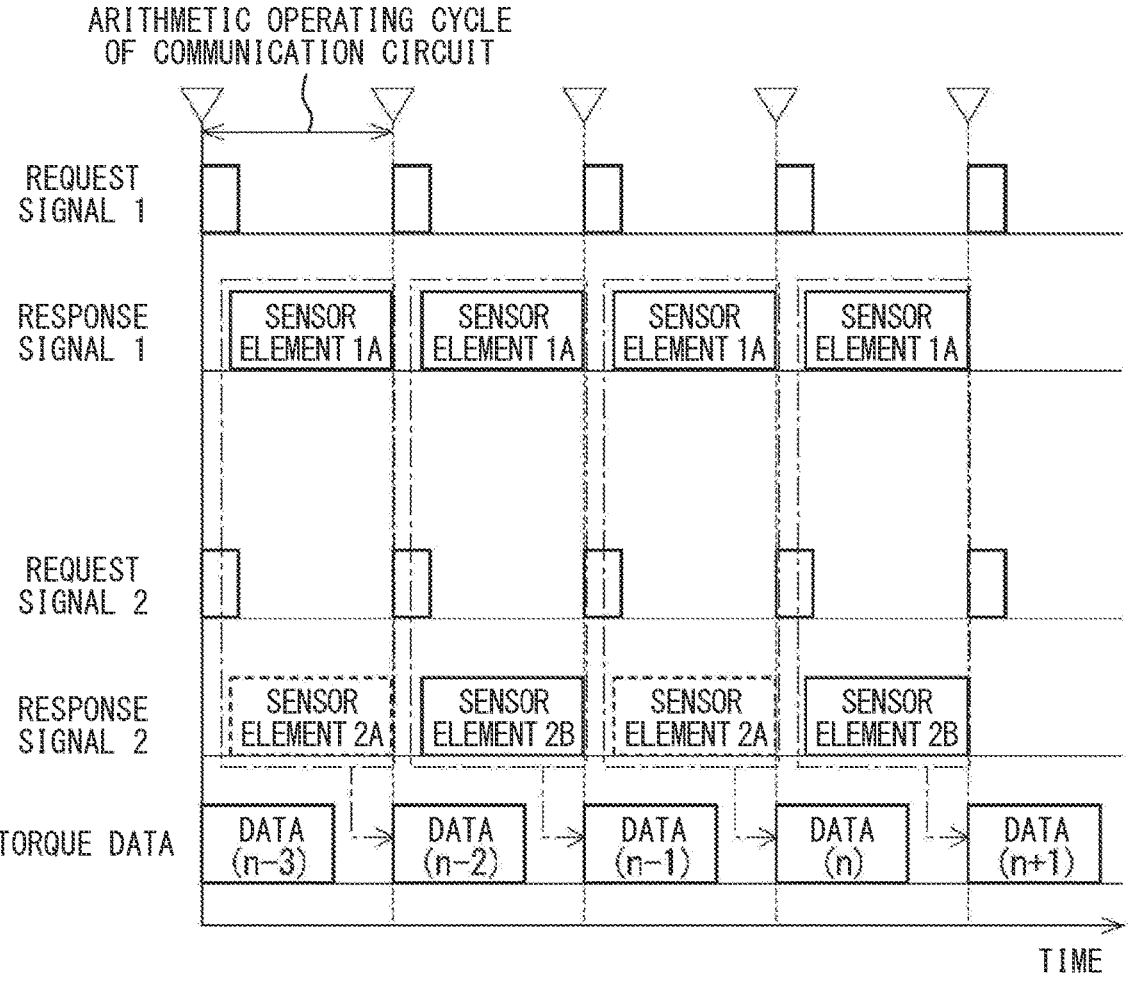
FIG. 15 is a time chart illustrating calculation of torque data at a time in which one of two systems has an abnormality according to a fourth embodiment.

A fourth embodiment is illustrated in FIG. 15. In the present embodiment, the first sensor unit 21 transmits an output signal of the sensor element 1A as the normal element in the abnormal system, and the second sensor unit 22 alternately transmits the signals of the sensor elements 2A, 2B as in the normal state. Even with such a structure, since it is possible to continue the calculation by adopting the value of a different sensor unit, it is possible to detect the abnormality such as voltage fixation and set the torque updating cycle to be identical as in the normal state. Further, the similar effects to those of the embodiment described above can also be achieved.

Fifth Embodiment

Figure 16:
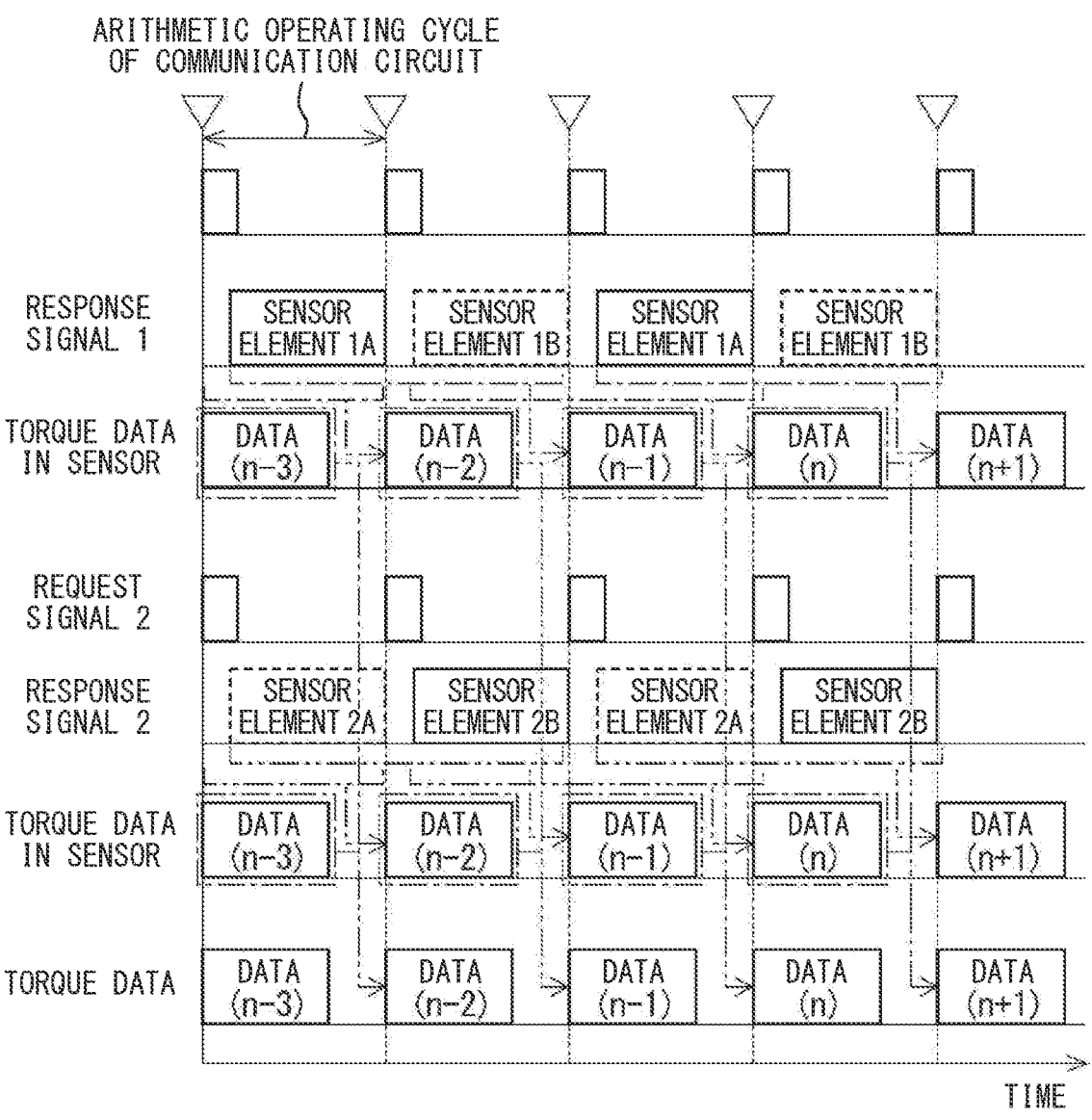
FIG. 16 is a time chart illustrating calculation of torque data according to a fifth embodiment.

A fifth embodiment is illustrated in FIG. 16. In the present embodiment, the arithmetic processing unit 18 calculates the in-sensor torque data $Tm1(n)$ of the first system adopting the present value and the previous value of the first sensor unit 21 as expressed in the equation (10). The arithmetic processing unit 18 calculates the in-sensor torque data $Tm2(n)$ of the second system adopting the present value and the previous value of the second sensor unit 22 as expressed in the equation (11). Then, the torque data $T(n)$ is calculated by adopting the in-sensor torque data $Tm1(n)$ and $Tm2(n)$ as expressed in the equation (12).

$$Tm1(n)=(T1(n)+T1(n-1))/2 \qquad \text{(equation 10)}$$

$$Tm2(n)=(T2(n)+T2(n-1))/2 \qquad \text{(equation 11)}$$

$$T(n)=(Tm1(n)+Tm2(n))/2 \qquad \text{(equation 12)}$$

In the present embodiment, when the data calculated by adopting the response signals acquired from the identical sensor unit respectively at the $(k-1)_{th}$ nearest preceding time to the present time, the arithmetic processing unit 18 calculates the torque data $T(n)$ by adopting the present value of each of the in-sensor torque data $Tm1$, $Tm2$ of the multiple sensor units 21, 22. The in-sensor torque data $Tm1$, $Tm2$ may be values calculated by the sensor units 21, 22 and transmitted to the controller 15. Also in this configuration, the similar effects to those of the embodiment described above can be achieved.

Sixth Embodiment

In a sixth embodiment, the first sensor unit 21 transmits the detected value of the sensor element 1A as a response signal for the request signal. The second sensor unit 21 transmits the detected value of the sensor element 2A as a response signal for the request signal. The transmission of the response signal and the calculation of the torque data are illustrated in, for example, FIG. 14.

The detected value of the sensor element 1B may be switched to be transmitted as a response signal at an arbitrary frequency F. If switching to the sensor element 1B is not performed, the frequency F=0 may be considered. From the viewpoint of fault monitoring, it may be preferable the timing at which the output signal of the sensor element 1B is transmitted from the first sensor unit 21 and the timing at which the output signal of the sensor element 2B is transmitted from the second sensor unit 22 are aligned. The same effects as those of the above embodiments can be obtained even in the configuration described above.

Seventh Embodiment

Figure 17:
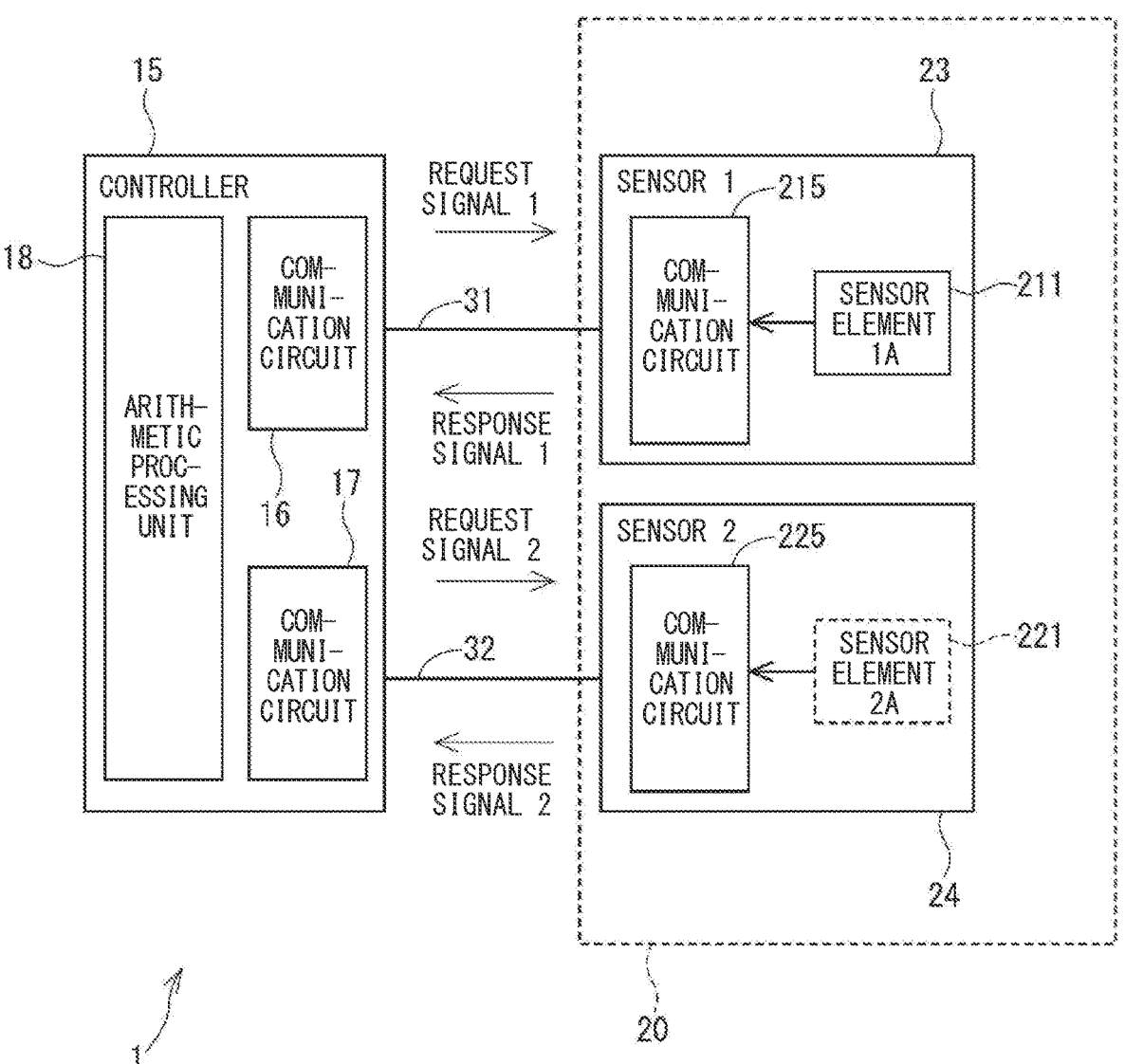
FIG. 17 is a block diagram illustrating a sensor device according to a sixth embodiment.

A seventh embodiment is illustrated in FIG. 17. As shown in FIG. 17, the first sensor unit 23 has a single sensor element 211 and the second sensor unit 24 has a single sensor element 221. The first sensor unit 21 transmits the detected value of the sensor element 1A as a response signal for the request signal. The second sensor unit 24 transmits the detected value of the sensor element 2A as a response signal in response to the request signal. The transmission of the response signal and the calculation of the torque data are illustrated in, for example, FIG. 14. As a result, this can simplify the configuration. Further, the similar effects to those of the embodiment described above can also be achieved.

In the embodiment, each of the communication circuits 215, 225 located closer to the sensor corresponds to a first communication circuit; each of the communication circuits 16, 17 corresponds to a second communication circuit; the torque data corresponds to detection data; and the in-sensor torque data corresponds to in-sensor detection data.

Other Embodiments

In one or more of the above embodiments, there are two sensor units, each of which includes one or two sensor elements. However, as another embodiment different from the above embodiments, the number of the sensor units may be three or more. Each sensor unit may have three or more sensor elements.

In one or more of the above embodiments, the sensor unit is applied to a torque sensor that detects steering torque. However, in one or more other embodiments, the sensor unit may detect torque other than the steering torque, or may detect one or more physical quantities other than the torque. In the above embodiment, the sensor device is applied to the electric power steering apparatus. In one or more other embodiments, the sensor device may be applied to other apparatuses different from the electric power steering apparatus.

The controller and the technique according to the present disclosure may be achieved by a dedicated computer provided by constituting a processor and a memory programmed to execute one or more functions embodied by a computer program. Alternatively, the control circuit and the method described in the present disclosure may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium. As described above, the present disclosure is not limited to the embodiments described above, and can be implemented in various forms without departing from the spirit of the present disclosure.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A sensor device comprising:
   a plurality of sensors, each of which includes
   a sensor element configured to detect a change in a physical quantity, and
   a sensor-side communication circuit configured to transmit a signal having a response signal according to a detected value of the sensor element in response to a request signal, the response signal being transmitted in response to the request signal on a one-to-one basis;
   a controller including
      a controller-side communication circuit configured to transmit the request signal and receive the response signal, and
      an arithmetic processing unit configured to calculate detection data according to the response signal; and
   a plurality of communication paths connecting the plurality of sensors to the controller, respectively,
   wherein the arithmetic processing unit is further configured to calculate the detection data by adopting response signals acquired in parallel from the plurality of sensors,
   wherein:
      the sensor element in each of the plurality of sensors includes a plurality of sensor elements, and number of the plurality of sensor elements is k being an integer greater than or equal to 2; and
      the plurality of sensors transmits the response signals being signals according to respective detected values of a first sensor element to a kth sensor element included in the sensor element in a predetermined sequential order, and
   wherein the arithmetic processing unit is further configured to:
      calculate the detection data based on the response signal acquired presently from each of the plurality of sensors; and
      calculate corrected detection data by adopting the detection data having (k−1)th nearest preceding detection data up to present detection data.

2. The sensor device according to claim 1, wherein:
   in-sensor detection data is data calculated by adopting the response signal including a (k−1)th nearest preceding response signal up to a present response signal generated in an identical one of the plurality of sensors; and
   the arithmetic processing unit is further configured to calculate the detection data by adopting a present value of the in-sensor detection data according to each of the plurality of sensors.

3. The sensor device according to claim 1,
   wherein, in a case where one or more of the plurality of sensors is in an abnormal state, the arithmetic processing unit is further configured to calculate the detection data by adopting the response signal having a (k−1)th nearest preceding response signal up to a present response signal generated in one or more of the plurality of sensors being in a normal state.

4. The sensor device according to claim 1, wherein, in a case where one or more of the plurality of sensors is in an abnormal state, the arithmetic processing unit is further configured to:

calculate the detection data by adopting the response signal of each of the plurality of sensor elements in one or more of the plurality of sensors being in a normal state; and execute correction processing for correcting delay in calculation of the detection data in a case where a cycle of the calculation of the detection data at a time of occurrence of an abnormality is longer than a cycle of the calculation of the detection data at a time of a normal operation.

5. The sensor device according to claim 1, wherein:

an abnormal system is a system in which one or more of the plurality of sensors is in an abnormal state;

a normal system is a system in which one or more of the plurality of sensors is in a normal state;

a normal element in the abnormal system is one or more of the plurality of sensor elements that transmits a normal detected value; and in a case where the abnormal system exists and the normal element is identified, the arithmetic processing unit is further configured to calculate the detection data by adopting the response signal according to the normal detected value of the normal element in the abnormal system, and the response signal transmitted from the normal system.

6. The sensor device according to claim 5, wherein the normal system is configured to change a signal transmission pattern, such that the normal system is configured to continue transmission of the response signal according to the detected value of the sensor element concurrently with transmission of the response signal generated in the normal element of the abnormal system before occurrence of an abnormality.

7. The sensor device according to claim 1, wherein:

in a case where k is equal to 2 and one of the plurality of sensors is in an abnormal state, another one of the plurality of sensors being in a normal state is configured to alternately transmit the response signal according to one of the plurality of sensor elements and the response signal according to another one of the plurality of sensor elements; and the arithmetic processing unit is configured to monitor an abnormality in the other one of the plurality of sensors being in the normal state by adopting the response signal having four latest response signals transmitted from the other one of the plurality of sensors being in the normal state.

8. A sensor device comprising:

a plurality of sensors, each of which includes a sensor element configured to detect a change in a physical quantity, and a sensor-side communication circuit configured to transmit a signal having a response signal according to a detected value of the sensor element in response to a request signal, the response signal being transmitted in response to the request signal on a one-to-one basis;

a controller including a controller-side communication circuit configured to transmit the request signal and receive the response signal, and an arithmetic processing unit configured to calculate detection data according to the response signal; and a plurality of communication paths connecting the plurality of sensors to the controller, respectively, wherein the arithmetic processing unit is further configured to calculate the detection data by adopting response signals acquired in parallel from the plurality of sensors, wherein:

the sensor element in each of the plurality of sensors includes a plurality of sensor elements, and number of the plurality of sensor elements is k being an integer greater than or equal to 2; and the plurality of sensors transmits the response signals being signals according to respective detected values of a first sensor element to a kth sensor element included in the sensor element in a predetermined sequential order, and wherein:

in-sensor detection data is data calculated by adopting the response signal including a (k−1)th nearest preceding response signal up to a present response signal generated in an identical one of the plurality of sensors; and the arithmetic processing unit is further configured to calculate the detection data by adopting a present value of the in-sensor detection data according to each of the plurality of sensors.

* * * * *